(12) United States Patent
Sasaka et al.

(10) Patent No.: US 6,186,204 B1
(45) Date of Patent: Feb. 13, 2001

(54) PNEUMATIC TIRE WITH TREAD FORMED WITH A RUBBER COMPOUND CONTAINING A RUBBER COMPONENT, A SOFTENER AND A BENZOTHIAZOLE COMPOUND TYPE VULCANIZATION ACCELERATOR

(75) Inventors: Naohiro Sasaka, Tokyo; Kazuo Yagawa, Saitama-ken; Shigeo Kimura, Tokyo, all of (JP)

(73) Assignee: Bridgestone Corporation, Tokyo (JP)

( * ) Notice: Under 35 U.S.C. 154(b), the term of this patent shall be extended for 0 days.

(21) Appl. No.: 09/107,431

(22) Filed: Jun. 30, 1998

(30) Foreign Application Priority Data

Jul. 11, 1997 (JP) ........................................ 9-186888
Mar. 24, 1998 (JP) ........................................ 10-075584

(51) Int. Cl.$^7$ ........................................ B06C 11/00
(52) U.S. Cl. ........................ 152/450; 152/209.5; 525/349
(58) Field of Search ................................. 152/450, 564, 152/209.5; 525/349, 332.9

(56) References Cited

U.S. PATENT DOCUMENTS

| 3,419,521 | 12/1968 | Scott . |
| 3,554,857 | 1/1971 | Barton . |
| 3,852,251 | 12/1974 | Maxey . |
| 3,927,144 | 12/1975 | Hayashi et al. . |

FOREIGN PATENT DOCUMENTS

| 20 56 762 | 5/1971 | (DE) ........................ C07D/91/48 |
| 0 697 432 A1 | 2/1996 | (EP) . |
| 0 818 499 A1 | 1/1998 | (EP) ........................ C08K/5/47 |
| 49-93361 | 9/1974 | (JP) . |
| 56-139542 | 10/1981 | (JP) . |
| 58-87138 | 5/1983 | (JP) . |
| 10053003 | 2/1998 | (JP) . |

OTHER PUBLICATIONS

Abstract No. 216568, *Chemical Abstracts*, vol. 89, No. 26, Dec. 25, 1978.
Abstract No. 44671, *Chemical Abstracts*, vol. 114, No. 6, Feb. 11, 1991.
European Search Report.

*Primary Examiner*—Christopher Henderson
(74) *Attorney, Agent, or Firm*—Sughrue, Mion, Zinn, Macpeak & Seas, PLLC

(57) ABSTRACT

A pneumatic tire comprising a tread portion formed by using a rubber composition which comprises: a rubber component comprising 50 parts by weight or more of SBR in 100 parts by weight of the rubber component; optionally, 5 to 40 parts by weight of aluminum hydroxide per 100 parts of the rubber component; per 100 parts by weight of the rubber component, 20 parts by weight or more of a softener which comprises 5 to 55 parts by weight of a specific resin softener having a softening point of 35 to 150° C.; and per 100 parts by weight of the rubber component, 0.2 to 10.0 parts by weight of a specific vulcanization accelerator of a dithiophosphoric acid compound or a specific vulcanization accelerator of a benzothiazole compound. The pneumatic tire exhibits excellent stability and controllability on wet roads or a combination of excellent stability and controllability on wet roads and excellent comfort of ride even when a vehicle is vibrating throughout the life of the pneumatic tire.

22 Claims, No Drawings

PNEUMATIC TIRE WITH TREAD FORMED WITH A RUBBER COMPOUND CONTAINING A RUBBER COMPONENT, A SOFTENER AND A BENZOTHIAZOLE COMPOUND TYPE VULCANIZATION ACCELERATOR

BACKGROUND OF THE INVENTION

1. Field of the Invention

The present invention relates to a pneumatic tire, and more particularly, to a pneumatic tire which exhibits excellent stability and controllability on wet roads (hereinafter referred to as controllability) or a combination of excellent controllability on wet roads and excellent comfort of ride even when a vehicle is vibrating (hereinafter referred to as ride comfort) throughout the life of the pneumatic tire including the initial, intermediate, and final periods of tire use.

2. Description of the Related Art

In recent years, as the higher power, higher performance, and longer life have been desired of automobiles, tires have been increasingly required to have more excellent controllability or a combination of more excellent controllability and ride comfort than hitherto throughout the life of the pneumatic tire. Particularly for passenger tires, highly excellent controllability or a combination of highly excellent controllability and ride comfort is strongly required as the tire structure changes from a bias structure to a radial structure and the aspect ratio of radial tires changes from 82 to 72 and further to 65.

To satisfy the requirement, various compounding ingredients used in rubber compositions for tire treads have been examined. As for the vulcanization accelerator, it is disclosed in Japanese Patent Application Laid-Open No. 58-87138 that a rubber composition comprising a specific vulcanization accelerator and a specific antioxidant shows improved resistance to hardening under heating and provides a tire showing improved appearance in the final period of tire use. However, performances of the tire during driving are not examined at all. It is disclosed in Japanese Patent Application Laid-Open No. 56-139542 that scorching in mixing to prepare a rubber composition can be improved by the use of a rubber composition comprising a specific vulcanization accelerator. However, performances of a tire are not described or suggested at all. With respect to inorganic fillers, it is disclosed in Japanese Patent Application Laid-Open No. 10-53003 that a rubber composition comprising alumina provides a tire showing improved controllability in the initial period of tire use. However, the improved controllability cannot be maintained in the intermediate to final periods of tire use.

SUMMARY OF THE INVENTION

The present invention has been made under the above circumstances, and the object of the present invention is to provide a pneumatic tire exhibiting excellent controllability or a combination of excellent controllability and excellent ride comfort throughout the life of the pneumatic tire including the initial, intermediate, and final periods of tire use.

As the result of extensive studies by the present inventors in which attention was paid on polymers and compounding ingredients, the present inventors found that the object could be achieved by the following means, and thus, the inventors arrived at the present invention.

Accordingly, the present invention provides (1) a pneumatic tire comprising a tread portion formed by using a rubber composition which comprises:

a rubber component comprising 50 parts by weight or more of SBR in 100 parts by weight of the rubber component;

per 100 parts by weight of the rubber component, 20 parts by weight or more of a softener which comprises 5 to 55 parts by weight of at least one resin softener having a softening point of 35 to 150° C. and selected from the group consisting of coumarone resins, phenol-terpene resins, and petroleum hydrocarbon resins; and per 100 parts by weight of the rubber component, 0.2 to 10.0 parts by weight of at least one dithiophosphoric acid compound type vulcanization accelerator selected from the group consisting of O,O'-dialkyldithiophosphoric acid disulfides, O,O'-dialkyldithiophosphoric acid tetrasulfides, and metal dithiophosphates represented by following general formula (I):

general formula (I)

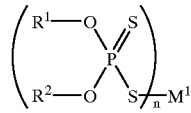

wherein $R^1$ and $R^2$ each independently represents an alkyl group having 1 to 8 carbon atoms or an aryl group having 6 to 10 carbon atoms, the alkyl group being a linear, branched, or cyclic group; $M^1$ represents a Zn atom, an Sb atom, an Fe atom, or a Cu atom; and n represents a valency of the metal represented by $M^1$.

(2) It is preferable that the metal dithiophosphate represented by general formula (I) which is described in (1) is a dithiophosphoric acid compound type vulcanization accelerator which is represented by following general formula (II):

general formula (II)

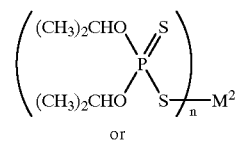

or

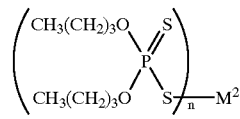

wherein $M^2$ represents a Zn atom or an Sb atom; and n represents a valency of the metal represented by $M^2$.

The present invention also provides (3) a pneumatic tire comprising a tread portion formed by using a rubber composition which comprises:

a rubber component comprising 50 parts by weight or more of SBR in 100 parts by weight of the rubber component;

per 100 parts by weight of the rubber component, 20 parts by weight or more of a softener which comprises 5 to 55 parts by weight of at least one resin softener having a softening point of 35 to 150° C. and selected from the group consisting of coumarone resins, phenol-terpene resins, and petroleum hydrocarbon resins; and per 100 parts by weight of the rubber component, 0.2 to 10.0 parts by weight of at least one benzothiazole compound type vulcanization accelerator selected from the group consisting of compounds represented by following general formulae (III), (IV), (V), and (VI):

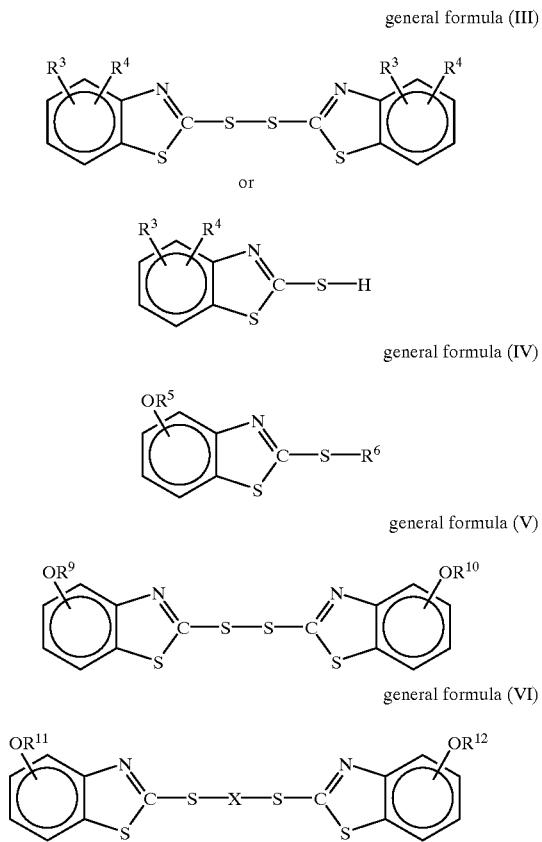

wherein $R^3$ and $R^4$ each independently represents a hydrogen atom, an alkyl group having 1 to 8 carbon atoms, or an aryl group having 6 to 10 carbon atoms, excluding the case in which $R^3$ and $R^4$ both represent hydrogen atoms; $R^5$ represents an alkyl group having 1 to 8 carbon atoms, an alkenyl group, or a cycloalkyl group; $R^6$ represents a hydrogen atom or an amino group represented by $-N(R^7)R^8$, wherein $R^7$ and $R^8$ each independently represents a hydrogen atom, an alkyl group having 2 to 4 carbon atoms, or cyclohexyl group, excluding the case in which $R^7$ and $R^8$ both represent hydrogen atoms; $R^9$ and $R^{10}$ each independently represents an alkyl group having 1 to 8 carbon atoms, an alkenyl group, or a cycloalkyl group; X represents a Zn atom, a Cu atom, or an amino group represented by $>N-R^{13}$, wherein $R^{13}$ represents an alkyl group having 2 to 4 carbon atoms or cyclohexyl group; and $R^{11}$ and $R^{12}$ each independently represents the same group as that represented by $R^9$.

(4) It is preferable that, in general formula (III) representing the benzothiazole compound type vulcanization accelerator which is described in (3), $R^3$ and $R^4$ each independently represents a hydrogen atom, methyl group, ethyl group, or phenyl group, excluding the case in which $R^3$ and $R^4$ both represent hydrogen atoms.

(5) It is preferable that the benzothiazole compound type vulcanization accelerator represented by general formula (III) which is described in (3) is at least one compound selected from the group consisting of bis(4-methylbenzothiazolyl-2) disulfide, bis(5-methyl-benzothiazolyl-2) disulfide, mercapto-4-methyl-benzothiazole, and mercapto-5-methylbenzothiazole.

(6) It is preferable that, in general formulae (IV), (V), and (VI) representing the benzothiazole compound type vulcanization accelerator which are described in (3), the alkoxy group is bonded to the 4-position or the 6-position, more preferably to the 4-position, of the aromatic single ring.

(7) It is preferable that, in general formulae (IV), (V), and (VI) representing the benzothiazole compound type vulcanization accelerator which are described in (3), the alkoxy group is a group selected from the group consisting of methoxy group, ethoxy group, and butoxy group, and more preferably ethoxy group.

(8) It is preferable that the resin softener described in any of (1) and (3) has a softening point of 70 to 130° C.

(9) It is preferable that, in any of (1) and (3), the coumarone resin used as the resin softener is a coumarone-indene resin having a softening point of 70 to 130° C.

(10) It is preferable that, in any of (1) and (3), the phenol-terpene resin used as the resin softener is a phenol-acetylene resin or a phenol-formaldehyde resin.

(11) It is preferable that, in any of (1) and (3), the petroleum hydrocarbon resin used as the resin softener is an aliphatic cyclic hydrocarbon resin or an aromatic hydrocarbon resin.

(12) It is preferable that, in any of (1) and (3), the rubber component comprises SBR in an amount such that the styrene units of the SBR account for 20% by weight or more of 100% by weight of the rubber component.

(13) It is preferable that, in any of (1) and (3), an SBR containing 30% by weight or more of styrene is comprised in the rubber component.

The present invention also provides (14) a pneumatic tire comprising a tread portion formed by using a rubber composition which comprises:

a rubber component comprising 50 parts by weight or more of SBR in 100 parts by weight of the rubber component;

5 to 40 parts by weight of aluminum hydroxide per 100 parts by weight of the rubber component;

per 100 parts by weight of the rubber component, 20 parts by weight or more of a softener which comprises 5 to 55 parts by weight of at least one resin softener having a softening point of 35 to 150° C. and selected from the group consisting of coumarone resins, phenol-terpene resins, and petroleum hydrocarbon resins; and per 100 parts by weight of the rubber component, 0.2 to 10.0 parts by weight of at least one dithiophosphoric acid compound type vulcanization accelerator selected from the group consisting of O,O'-dialkyldithiophosphoric acid disulfides, O,O'-dialkyldithiophosphoric acid tetrasulfides, and metal dithiophosphates represented by following general formula (I):

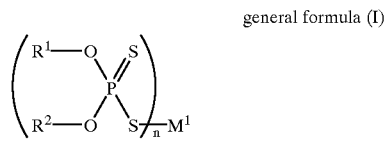

wherein $R^1$ and $R^2$ each independently represents an alkyl group having 1 to 8 carbon atoms or an aryl group having 6 to 10 carbon atoms, the alkyl group being a linear, branched, or cyclic group; $M^1$ represents a Zn atom, an Sb atom, an Fe atom, or a Cu atom; and n represents a valency of the metal represented by $M^1$.

(15) It is preferable that the metal dithiophosphate represented by general formula (I) which is described in (14) is a dithiophosphoric acid compound type vulcanization accelerator which is represented by following general formula (II):

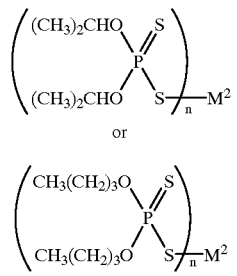

general formula (II)

wherein $M^2$ represents a Zn atom or an Sb atom; and n represents a valency of the metal represented by $M^2$.

The present invention also provides (16) a pneumatic tire comprising a tread portion formed by using a rubber composition which comprises:

a rubber component comprising 50 parts by weight or more of SBR in 100 parts by weight of the rubber component;

5 to 40 parts by weight of aluminum hydroxide per 100 parts by weight of the rubber component;

per 100 parts by weight of the rubber component, 20 parts by weight or more of a softener which comprises 5 to 55 parts by weight of at least one resin softener having a softening point of 35 to 150° C. and selected from the group consisting of coumarone resins, phenol-terpene resins, and petroleum hydrocarbon resins; and per 100 parts by weight of the rubber component, 0.2 to 10.0 parts by weight of at least one benzothiazole compound type vulcanization accelerator selected from the group consisting of compounds represented by following general formulae (III), (IV), (V), and (VI):

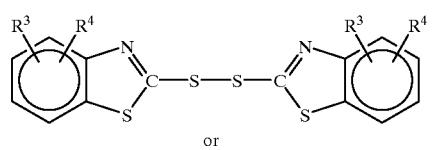

general formula (III)

or

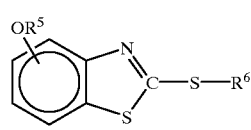

general formula (IV)

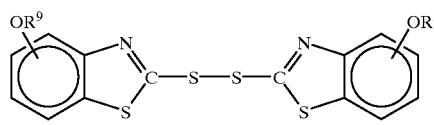

general formula (V)

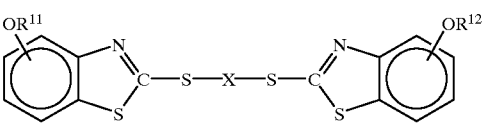

general formula (VI)

wherein $R^3$ and $R^4$ each independently represents a hydrogen atom, an alkyl group having 1 to 8 carbon atoms, or an aryl group having 6 to 10 carbon atoms, excluding the case in which $R^3$ and $R^4$ both represent hydrogen atoms; $R^5$ represents an alkyl group having 1 to 8 carbon atoms, an alkenyl group, or a cycloalkyl group; $R^6$ represents a hydrogen atom or an amino group represented by $-N(R^7)R^8$, wherein $R^7$ and $R^8$ each independently represents a hydrogen atom, an alkyl group having 2 to 4 carbon atoms, or cyclohexyl group, excluding the case in which $R^7$ and $R^8$ both represent hydrogen atoms; $R^9$ and $R^{10}$ each independently represents an alkyl group having 1 to 8 carbon atoms, an alkenyl group, or a cycloalkyl group; X represents a Zn atom, a Cu atom, or an amino group represented by $>N-R^{13}$, wherein $R^{13}$ represents an alkyl group having 2 to 4 carbon atoms or cyclohexyl group; and $R^{11}$ and $R^{12}$ each independently represents the same group as that represented by $R^9$.

(17) It is preferable that, in general formula (III) representing the benzothiazole compound type vulcanization accelerator which is described in (16), $R^3$ and $R^4$ each independently represents a hydrogen atom, methyl group, ethyl group, or phenyl group, excluding the case in which $R^3$ and $R^4$ both represent hydrogen atoms.

(18) It is preferable that the benzothiazole compound type vulcanization accelerator represented by general formula (III) which is described in (16) is at least one compound selected from the group consisting of bis(4-methylbenzothiazolyl-2) disulfide, bis(5-methylbenzothiazolyl-2) disulfide, mercapto-4-methylbenzothiazole, and mercapto-5-methylbenzothiazole.

(19) It is preferable that, in general formulae (IV), (V), and (VI) representing the benzothiazole compound type vulcanization accelerator which are described in (16), the alkoxy group is bonded to the 4-position or the 6-position, more preferably to the 4-position, of the aromatic single ring.

(20) It is preferable that, in general formulae (IV), (V), and (VI) representing the benzothiazole compound type vulcanization accelerator which are described in (16), the alkoxy group is a group selected from the group consisting of methoxy group, ethoxy group, and butoxy group, and more preferably ethoxy group.

(21) It is preferable that the resin softener described in any of (14) and (16) has a softening point of 70 to 130° C.

(22) It is preferable that, in any of (14) and (16), the coumarone resin used as the resin softener is a coumarone-indene resin having a softening point of 70 to 130° C.

(23) It is preferable that, in any of (14) and (16), the phenol-terpene resin used as the resin softener is a phenol-acetylene resin or a phenol-formaldehyde resin.

(24) It is preferable that, in any of (14) and (16), the petroleum hydrocarbon resin used as the resin softener is an aliphatic cyclic hydrocarbon resin or an aromatic hydrocarbon resin.

(25) It is preferable that, in any of (14) and (16), the rubber component comprises SBR in an amount such that the styrene units of the SBR account for 20% by weight or more of 100% by weight of the rubber component.

(26) It is preferable that, in any of (14) and (16), an SBR containing 30% by weight or more of styrene is comprised in the rubber component.

In one embodiment of the present invention in which aluminum hydroxide is not used as a component of the rubber composition, the present invention is characterized in that a specific resin softener and a specific vulcanization accelerator are used in combination as described above in (1) to (13).

When the resin softener specified in the present invention is not used, a tread rubber in a tire shows gradual hardening in the final period of tire use although hardening is suppressed until the intermediate period. When the resin softener specified in the present invention is used, i.e., in accordance with the present invention, hardening of the rubber caused by migration of the resin softener into other members of the tire can be suppressed in the final period of tire use. Therefore, in accordance with the present invention, decrease in controllability and ride comfort can be suppressed particularly in the final period of tire use.

In conventional formulations, aromatic oils are generally used as the softener. These softeners migrate into other members of a tire, such as a tire case, containing less amount of oil, and this migration causes hardening of a tread rubber which, in turn, causes inferior controllability and ride comfort of the tire. It has been found that hardening of the rubber can remarkably be suppressed because the specific softener in accordance with the present invention shows less tendency to migrate into other members. Thus, the pneumatic tire of the present invention having excellent controllability and excellent ride comfort has been obtained by using the specific softener in combination with the specific vulcanization accelerator.

In another embodiment of the present invention in which aluminum hydroxide is used as a component of the rubber composition, the present invention is characterized in that three components which are aluminum hydroxide, a specific resin softener, and a specific vulcanization accelerator are used in combination as described above in (14) to (26).

In other words, (1) hardening of rubber caused by heat history in the period of tire use after the intermediate period is suppressed by the vulcanization accelerator represented by general formulae (I) to (VI), thus rubber being kept soft; (2) hardening of rubber caused by heat history in the final period of tire use is further suppressed by the specific resin softener related to the present invention, thus rubber being kept soft; and (3) the softer the rubber, the greater the effect of aluminum hydroxide to increase controllability of a tire.

More specifically, when aluminum hydroxide is present in rubber which is kept soft by the presence of the specific resin softener and the specific vulcanization, accelerator as described above in (1), (2), and (3), controllability of a tire is remarkably improved in the intermediate and final periods of tire use in which rubber is generally heat aged and hardened in comparison with corresponding controllability of a tire obtained by the single use of aluminum hydroxide, the above specific softener, or the above vulcanization accelerator. In other words, it was found that excellent controllability could be obtained by the synergistic effect of the combined use of the three components which are aluminum hydroxide, the specific resin softener, and the specific vulcanization accelerator. The pneumatic tire of the present invention has been obtained on the basis of this new knowledge.

DESCRIPTION OF THE PREFERRED EMBODIMENTS

The rubber composition used for the tire tread portion in the present invention, i.e. the rubber composition comprising various types of compounding ingredients related to the present invention, may be applied to rubber of the tread portion composed of a single layer. Alternatively, when the tread portion is composed of two layers which are cap rubber disposed at an outer position in the radial direction and base rubber disposed at an inner position in the radial direction, the above rubber composition for the tire tread portion may be applied to both cap rubber and base rubber or to the base rubber alone. It is preferable that the rubber composition is applied to the base rubber.

It is necessary that the rubber composition for the tread portion comprise 50 parts by weight or more, preferably 70 parts by weight or more, of SBR (styrene-butadiene rubber) in 100 parts by weight of a rubber component. When the amount of SBR is less than 50 parts by weight, controllability and ride comfort are inferior, and such an amount is not preferable. It is preferable that the rubber component comprises SBR in an amount such that the styrene units of the SBR account for 20% by weight or more of 100% by weight of the rubber component. This means that, for example, when 50 parts by weight of SBR is mixed with 50 parts by weight of natural rubber as another rubber component, the content of the styrene unit of SBR is preferably 40% by weight or more.

It is also preferable that an SBR containing 30% by weight or more of styrene is comprised in the rubber component. This means that, for example, when 10 parts by weight of SBR containing 35% by weight of the styrene unit, 40 parts by weight of SBR containing 23.5% by weight of the styrene unit, and 50 parts by weight of natural rubber as another rubber component are mixed together, the obtained rubber component comprises less than 20% by weight of the styrene unit in 100% by weight of the total rubber component, and this rubber component can be used in the present invention.

SBR used in the present invention is not particularly limited as long as the above conditions are satisfied. Commercial SBR obtained by the emulsion polymerization or the solution polymerization can be used.

As the rubber component in the present invention, for example, other types of SBR, natural rubber, and synthetic rubbers, such as isoprene rubber, butadiene rubber, butyl rubber including halogenated butyl rubber, and ethylene-propylene rubber, can be used in addition to SBR of the present invention.

In the present invention, aluminum hydroxide [$Al(OH)_3$] is used in an amount of 5 to 40 parts by weight, preferably 10 to 30 parts by weight, per 100 parts by weight of the rubber component. When the amount is less than 5 parts by weight, the effect of improving controllability of the tire is small. When the amount exceeds 40 parts by weight, abrasion resistance decreases. Therefore, such amounts are not preferable. The average particle diameter of aluminum hydroxide is preferably 0.01 to 10 $\mu$m, more preferably 0.01 to 2 $\mu$m. When the average particle diameter is less than 0.01 $\mu$m, workability in mixing is inferior. When the average particle diameter exceeds 10 $\mu$m, fracture properties, particularly abrasion resistance, of the tread rubber deteriorate. Therefore, such amounts are not preferable.

In the present invention, the rubber composition comprises a softener in a total amount of 20 parts by weight or more per 100 parts by weight of the rubber component. The softener in this amount comprises 5 to 55 parts by weight, preferably 10 to 55 parts by weight in view of the effect, of at least one resin softener having a softening point of 35 to 150° C., preferably 70 to 130° C. in view of the effect, and selected from the group consisting of coumarone resins, phenol-terpene resins, and petroleum hydrocarbon resins. When the amount of the resin softener is less than 5 parts by weight, a sufficient effect cannot be obtained. When the amount exceeds 55 parts by weight, workability and abrasion resistance decrease. Therefore, such amounts are not preferable.

When the softening point of the resin softener is lower than 35° C., migration of the resin softener to other members of the tire increases. When the softening point exceeds 150° C., workability in mixing and dispersion deteriorate. Therefore, such softening points are not preferable.

Examples of the coumarone resin include coumarone-indene resins and mixtures of coumarone resins, naphthenic oils, phenol resins, and rosins. Among these resins, coumarone-indene resins are preferable in view of the effect.

Examples of the phenol-terpene resin include phenol-acetylene resins, phenol-formaldehyde resins, terpene-phenol resins, polyterpene resins, and xylene-formaldehyde resins. Among these resin, phenol-acetylene resins and phenol-formaldehyde resin are preferable in view of the effect.

Examples of the petroleum hydrocarbon resin include synthetic polyterpene resins; aromatic hydrocarbon resins, such as NISSEKI NEOPOLYMER 80 (a trade name, manufactured by NIPPON OIL Co., Ltd.); aliphatic hydrocarbon resins, such as TACKIROL 1000 (a trade name, manufactured by SUMITOMO CHEMICAL Co., Ltd.); aliphatic cyclic hydrocarbon resins, such as dicyclopentadiene resins; aliphatic aromatic petroleum resins, such as HI-REZ G100X (a trade name, manufactured by MITSUI PETROCHEMICAL INDUSTRIES, Ltd.); hydrogenated hydrocarbon resins, such as ESCOREZ 5300 (a trade name, manufactured by EXXON CHEMICAL Co., Ltd.); hydrocarbon tackified resins, such as PICCOTAC RESINS A (a trade name, manufactured by HERCULES JAPAN Co., Ltd.); aliphatic alicyclic petroleum resins, such as ESCOREZ 1401 (a trade name, manufactured by EXXON CHEMICAL Co., Ltd.); rosin derivatives; and terpene resins. Among these resins, aliphatic cyclic hydrocarbon resins and aromatic hydrocarbon resins are preferable in view of the effect.

The dithiophosphoric acid compound type vulcanization accelerator which is used in one embodiment of the present invention is at least one compound selected from the group consisting of metal dithiophosphates represented by general formula (I) described above, O,O'-dialkyldithiophosphoric acid disulfides, and O,O'-dialkyldithiophosphoric acid tetrasulfides.

In general formula (I) representing the metal dithiophosphate, $R^1$ and $R^2$ each independently represents an alkyl group having 1 to 8 carbon atoms or an aryl group having 6 to 10 carbon atoms. The alkyl group may be a linear, branched, or cyclic group. $M^1$ represents a Zn atom, an Sb atom, an Fe atom, or a Cu atom, and n represents a valency of $M^1$. $R^1$ and $R^2$ each preferably represents an alkyl group having 3 or 4 carbon atoms. When the alkyl group in a metal dithiophosphate has 2 or less carbon atoms, solubility of the metal dithiophosphate into rubber tends to decrease. When the alkyl group in a metal dithiophosphate has 5 or more carbon atoms, the effect expected from the increased number of the carbon atom is not always exhibited, and a number of the carbon atom of 5 or more is not always effective in view of the economy, either. As the metal, a Zn atom or an Sb atom is preferable. In other words, metal dithiophosphates represented by general formula (II) are preferable.

Examples of the metal dithiophosphate include zinc O,O'-dipropyldithiophosphate, zinc O,O'-diisopropyldithiophosphate, zinc O,O'-di-n-buyldithiophosphate, zinc O,O'-di-sec-butyldithiophosphate, zinc O,O'-di-t-butyldithiophosphate, zinc O,O'-diphenyldithiophosphate, zinc O,O'-dicyclohexyldithiophosphate, antimony O,O'-dipropyl-dithiophosphate, antimony O,O'-diisopropyldithiophosphate, antimony O,O'-di-n-butyldithiophosphate, antimony O,O'-di-sec-butyldithiophosphate, antimony O,O'-di-t-butyl-dithiophosphate, antimony O,O'-diphenyldithiophosphate, and antimony O,O'-dicyclohexyldithiophosphate. Among these compounds, zinc O,O'-diisopropyldithiophosphate, zinc O,O'-di-n-butyldithiophosphate, antimony O,O'-diisopropyl-dithiophosphate, and antimony O,O'-di-n-butyl-dithiophosphate are preferable. These vulcanization accelerators may be used singly or as a mixture of two or more types.

Examples of the O,O'-dialkyldithophosphoric acid disulfide and O,O'-dialkyldithiophosphoric acid tetrasulfide include O,O'-dibutyldithiophosphoric acid disulfide, O,O'-diisopropyldithiophosphoric acid disulfide, O,O'-dipropyldithiophosphoric acid disulfide, O,O'-diethyl-dithiophosphoric acid disulfide, O,O'-dimethyl-dithiophosphoric acid disulfide, O,O'-bis(2-ethylhexyl) dithiophosphoric acid disulfide, O,O'-bis(4-methylpentyl) dithiophosphoric acid disulfide, O,O'-dioctadecyldithiophosphoric acid disulfide, O,O'-dibutyl-dithiophosphoric acid tetrasulfide, O,O'-diisopropyl-dithiophosphoric acid tetrasulfide, O,O'-dipropyl-dithiophosphoric acid tetrasulfide, O,O'-diethyl-dithiophosphoric acid tetrasulfide, O,O'-dimethyl-dithiophosphoric acid tetrasulfide, O,O'-bis(2-ethylhexyl) dithiophorphoric acid tetrasulfide, O,O'-bis(4-methylpentyl) dithiophosphoric acid tetrasulfide, and O,O'-dioctadecyldithiophosphoric acid tetrasulfide. Among these compounds, O,O'-dibutyldithiophosphoric acid tetrasulfide, O,O'-diisopropyldithiophosphoric acid tetrasulfide, and O,O'-bis(2-ethylhexyl)dithiophosphoric acid tetrasulfide are preferable in view of the effect.

It is necessary that the rubber composition comprise the above dithiophosphoric acid compound type vulcanization accelerator in an amount of 0.2 to 10.0 parts by weight, preferably 0.5 to 5.0 parts by weight, per 100 parts by weight of the rubber component. When the amount is less than 0.2 parts by weight, the effect of improving controllability and ride comfort of the tire in the intermediate to final periods of tire use is small. When the vulcanization accelerator is used in an amount exceeding 10.0 parts by weight, no further increase in the effect expected from the increased amount is obtained, and an amount exceeding the range is not effective in view of economy, either.

The benzothiazole compound type vulcanization accelerator which is used in another embodiment of the present invention is at least one compound selected from the group consisting of compounds represented by general formula (III), (IV), (V), or (VI) shown above.

In general formula (III) representing the benzothiazole compound type vulcanization accelerator which is used in the present invention, $R^3$ and $R^4$ each independently represents a hydrogen atom, an alkyl group having 1 to 8 carbon atoms, or an aryl group having 6 to 10 carbon atoms;

preferably a hydrogen atom, an alkyl group having 1 to 6 carbon atoms, or an aryl group having 6 to 10 carbon atoms; more preferably a hydrogen group, methyl group, ethyl group, or phenyl group; excluding the case in which $R^3$ and $R^4$ both represent hydrogen atoms.

Examples of the above vulcanization accelerator include 2-mercapto-4-methylbenzothiazole, 2-mercapto-4-ethylbenzothiazole, 2-mercapto-5-methylbenzothiazole, 2-mercapto-5-ethylbenzothiazole, 2-mercapto-6-methylbenzothiazole, 2-mercapto-6-ethylbenzothiazole, 2-mercapto-4,5-dimethylbenzothiazole, 2-mercapto-4,5-diethyl-benzothiazole, 2-mercapto-4-phenylbenzothiazole, 2-mercapto-5-phenylbenzothiazole, 2-mercapto-6-phenylbenzothiazole, bis(4-methylbenzothiazolyl-2) disulfide, bis(4-ethylbenzothiazolyl-2) disulfide, bis(5-methyl-benzothiazolyl-2) disulfide, bis(5-ethylbenzothiazolyl-2) disulfide, bis(6-methylbenzothiazolyl-2) disulfide, bis(6-ethylbenzothiazolyl-2) disulfide, bis(4,5-dimethylbenzothiazolyl-2) disulfide, bis(4,5-diethylbenzothiazolyl-2) disulfide, bis(4-phenylbenzothiazolyl-2) disulfide, bis(5-phenylbenzothiazolyl-2) disulfide, and bis(6-phenylbenzothiazolyl-2) disulfide. Among these compounds, bis(4-methylbenzothiazolyl-2) disulfide, bis(5-methylbenzothiazolyl-2) disulfide, mercapto-4-methylbenzothiazole, and mercapto-5-methylbenzothiazole are preferable. These vulcanization accelerators may be used singly or as a mixture of two or more types.

The process for producing these vulcanization accelerators is not particularly limited, and the vulcanization accelerators can easily be produced, for example, in accordance with the process described in Japanese Patent Application Laid-Open No. 49-93361.

The benzothiazole compound type vulcanization accelerators represented by general formula (IV), (V), or (VI), which are used in the present invention, are 2-mercaptobenzothiazole compounds having alkoxy groups. These compounds may be used singly or as a mixture of two or more types.

In the above formulae, $R^5$ represents an alkyl group having 1 to 8 carbon atoms, an alkenyl group, or cycloalkyl group, and $R^6$ represents a hydrogen atom or an amino group represented by $—N(R^7)^8$. $R^7$ and $R^8$ each independently represents a hydrogen atom, an alkyl group having 2 to 4 carbon atoms, or cyclohexyl group, excluding the case in which $R^7$ and $R^8$ both represent hydrogen atoms. $R^9$ and $R^{10}$ each independently represents an alkyl group having 1 to 8 carbon atoms, an alkenyl group, or cyclohexyl group, and X represents a Zn atom, a Cu atom, or an amino group represented by $>N—R^{13}$. $R^{13}$ represents an alkyl group having 2 to 4 carbon atoms or cyclohexyl group. $R^{11}$ and $R^{12}$ each represents the same group as that represented by $R^9$.

In the above general formulae, it is preferable in view of the effect that the alkoxy groups, i.e., $—OR^5$, $—OR^9$, $—OR^{10}$, $—OR^{11}$, and $—OR^{12}$, each independently is methoxy group, ethoxy group, or butoxy group, and more preferably ethoxy group.

Examples of the benzothiazole compound type vulcanization accelerator represented by general formula (IV) include 4-methoxy-2-mercaptobenzothiazole, 5-methoxy-2-mercaptobenzothiazole, 6-methoxy-2-mercaptobenzothiazole, 7-methoxy-2-mercaptobenzothiazole, 4-ethoxy-2-mercaptobenzothiazole, 5-ethoxy-2-mercaptobenzothiazole, 6-ethoxy-2-mercaptobenzothiazole, 7-ethoxy-2-mercaptobenzothiazole, 4-butoxy-2-mercaptobenzothiazole, 5-butoxy-2-mercaptobenzothiazole, 6-butoxy-2-mercaptobenzothiazole, 7-butoxy-2-mercaptobenzothiazole, N-tert-butyl-4-methoxy-2-benzothiazolylsulfenamide, N-tert-butyl-5-methoxy-2-benzothiazolylsulfenamide, N-tert-butyl-6-methoxy-2-benzothiazolylsulfenamide, N-tert-butyl-7-methoxy-2-benzothiazolylsulfenamide, N-tert-butyl-4-ethoxy-2-benzothiazolylsulfenamide, N-tert-butyl-5-ethoxy-2-benzothiazolylsulfenamide, N-tert-butyl-6-ethoxy-2-benzothiazolylsulfenamide, N-tert-butyl-7-ethoxy-2-benzothiazolylsulfenamide, N-tert-butyl-4-butoxy-2-benzothiazolylsulfenamide, N-tert-butyl-5-butoxy-2-benzothiazolylsulfenamide, N-tert-butyl-6-butoxy-2-benzothiazolylsulfenamide, N-tert-butyl-7-butoxy-2-benzothiazolylsulfenamide, N-ethyl-4-methoxy-2-benzothiazolylsulfenamide, N-ethyl-5-methoxy-2-benzothiazolylsulfenamide, N-ethyl-6-methoxy-2-benzothiazolylsulfenamide, N-ethyl-7-methoxy-2-benzothiazolylsulfenamide, N-ethyl-4-ethoxy-2-benzothiazolylsulfenamide, N-ethyl-5-ethoxy-2-benzothiazolylsulfenamide, N-ethyl-6-ethoxy-2-benzothiazolylsulfenamide, N-ethyl-7-ethoxy-2-benzothiazolylsulfenamide, N-ethyl-4-ethoxy-2-benzothiazolylsulfenamide, N-ethyl-5-butoxy-2-benzothiazolylsulfenamide, N-ethyl-6-butoxy-2-benzothiazolylsulfenamide, N-ethyl-7-butoxy-2-benzothiazolylsulfenamide, N-cyclohexyl-4-methoxy-2-benzothiazolylsulfenamide, N-cyclohexyl-5-methoxy-2-benzothiazolylsulfenamide, N-cyclohexyl-6-methoxy-2-benzothiazolylsulfenamide, N-cyclohexyl-7-methoxy-2-benzothiazolylsulfenamide, N-cyclohexyl-4-ethoxy-2-benzothiazolylsulfenamide, N-cyclohexyl-5-ethoxy-2-benzothiazolylsulfenamide, N-cyclohexyl-6-ethoxy-2-benzothiazolylsulfenamide, N-cyclohexyl-7-ethoxy-2-benzothiazolylsulfenamide, N-cyclohexyl-4-ethoxy-2-benzothiazolylsulfenamide, N-cyclohexyl-5-butoxy-2-benzothiazolylsulfenamide, N-cyclohexyl-6-butoxy-2-benzothiazolylsulfenamide, N-cyclohexyl-7-butoxy-2-benzothiazolylsulfenamide, N,N-dicyclohexyl-4-methoxy-2-benzothiazolylsulfenamide, N,N-dicyclohexyl-5-methoxy-2-benzothiazolylsulfenamide, N,N-dicyclohexyl-6-methoxy-2-benzothiazolylsulfenamide, N,N-dicyclohexyl-7-methoxy-2-benzothiazolylsulfenamide, N,N-dicyclohexyl-4-ethoxy-2-benzothiazolylsulfenamide, N,N-dicyclohexyl-5-ethoxy-2-benzothiazolylsulfenamide, N,N-dicyclohexyl-6-ethoxy-2-benzothiazolylsulfenamide, N,N-dicyclohexyl-7-ethoxy-2-benzothiazolylsulfenamide, N,N-dicyclohexyl-4-butoxy-2-benzothiazolylsulfenamide, N,N-dicyclohexyl-5-butoxy-2-benzothiazolylsulfenamide, N,N-dicyclohexyl-6-butoxy-2-benzothiazolylsulfenamide, and N,N-dicyclohexyl-7-butoxy-2-benzothiazolylsulfenamide.

Examples of the benzothiazole compound type vulcanization accelerator represented by general formula (V) include di-4-methoxy-2-benzothiazyl disulfide, di-5-methoxy-2-benzothiazyl disulfide, di-6-methoxy-2-benzothiazyl disulfide, di-7-methoxy-2-benzothiazyl disulfide, di-4-ethoxy-2-benzothiazyl disulfide, di-5-ethoxy-2-benzothiazyl disulfide, di-6-ethoxy-2-benzothiazyl disulfide, di-7-ethoxy-2-benzothiazyl disulfide, di-4-butoxy-2-benzothiazyl disulfide, di-5-butoxy-2-benzothiazyl disulfide, di-6-butoxy-2-benzothiazyl disulfide, and di-7-butoxy-2-benzothiazyl disulfide, Examples of the benzothiazole compound type vulcanization accelerator represented by general formula (VI) include zinc salt of 4-methoxy-2-mercaptobenzothiazole, zinc salt of 5-methoxy-2-mercaptobenzothiazole, zinc salt of 6-methoxy-2-mercaptobenzothiazole, zinc salt of 7-methoxy-2-mercaptobenzothiazole, zinc salt of 4-ethoxy-2-mercaptobenzothiazole, zinc salt of 5-ethoxy-2-mercaptobenzothiazole, zinc salt of 6-ethoxy-2-mercaptobenzothiazole, zinc salt of 7-ethoxy-2-mercaptobenzothiazole, zinc salt of 4-butoxy-2-mercaptobenzothiazole, zinc salt of 5-butoxy-2-mercaptobenzothiazole, zinc salt of 6-butoxy-2-mercaptobenzothiazole, zinc salt of 7-butoxy-2-mercaptobenzothiazole, copper salt of 4-methoxy-2-mercaptobenzothiazole, copper salt of 5-methoxy-2-mercaptobenzothiazole, copper salt of 6-methoxy-2-mercaptobenzothiazole, copper salt of 7-methoxy-2-mercaptobenzothiazole, copper salt of 4-ethoxy-2-mercaptobenzothiazole, copper salt of 5-ethoxy-2-mercaptobenzothiazole, copper salt of 6-ethoxy-2-mercaptobenzothiazole, copper salt of 7-ethoxy-2-mercaptobenzothiazole, copper salt of 4-butoxy-2-mercaptobenzothiazole, copper salt of 5-butoxy-2-mercaptobenzothiazole, copper salt of 6-butoxy-2-mercaptobenzothiazole, copper salt of 7-butoxy-2-mercaptobenzothiazole, N-ethyl-(4-methoxy-2-benzothiazolyl)sulfenimide, N-ethyl-(5-methoxy-2-benzothiazolyl)sulfenimide, N-ethyl-(6-methoxy-2-benzothiazolyl)sulfenimide, N-ethyl-(7-methoxy-2-benzothiazolyl)sulfenimide, N-t-butyl-(4-methoxy-2-benzothiazolyl)sulfenimide, N-t-butyl-(5-methoxy-2-benzothiazolyl)sulfenimide, N-t-butyl-(6-methoxy-2-benzothiazolyl)sulfenimide, N-t-butyl-(7-methoxy-2-benzothiazolyl)sulfenimide, N-cyclohexyl-(4-methoxy-2-benzothiazolyl)sulfenimide, N-cyclohexyl-(5-methoxy-2-benzothiazolyl)sulfenimide, N-cyclohexyl-(6-methoxy-2-benzothiazolyl)sulfenimide, N-cyclohexyl-(7-methoxy-2-benzothiazolyl)sulfenimide, N-ethyl-(4-ethoxy-2-benzothiazolyl)sulfenimide, N-ethyl-(5-ethoxy-2-benzothiazolyl)sulfenimide, N-ethyl-(6-ethoxy-2-benzothiazolyl)sulfenimide, N-ethyl-(7-ethoxy-2-benzothiazolyl)sulfenimide, N-t-butyl-(4-ethoxy-2-benzothiazolyl)sulfenimide, N-t-butyl-(5-ethoxy-2-benzothiazolyl)sulfenimide, N-t-butyl-(6-ethoxy-2-benzothiazolyl)sulfenimide, N-t-butyl-(7-ethoxy-2-benzothiazolyl)sulfenimide, N-cyclohexyl-(4-ethoxy-2-benzothiazolyl)sulfenimide, N-cyclohexyl-(5-ethoxy-2-benzothiazolyl)sulfenimide, N-cyclohexyl-(6-ethoxy-2-benzothiazolyl)sulfenimide, N-cyclohexyl-(7-ethoxy-2-benzothiazolyl)sulfenimide, N-ethyl-(4-butoxy-2-benzothiazolyl)sulfenimide, N-ethyl-(5-butoxy-2-benzothiazolyl)sulfenimide, N-ethyl-(6-butoxy-2-benzothiazolyl)sulfenimide, N-ethyl-(7-butoxy-2-benzothiazolyl)sulfenimide, N-t-butyl-(4-butoxy-2-benzothiazolyl)sulfenimide, N-t-butyl-(5-butoxy-2-benzothiazolyl)sulfenimide, N-t-butyl-(6-butoxy-2-benzothiazolyl)sulfenimide, N-t-butyl-(7-butoxy-2-benzothiazolyl)sulfenimide, N-cyclohexyl-(4-butoxy-2-benzothiazolyl)sulfenimide, N-cyclohexyl-(5-butoxy-2-benzothiazolyl)sulfenimide, N-cyclohexyl-(6-butoxy-2-benzothiazolyl)sulfenimide, and N-cyclohexyl-(7-butoxy-2-benzothiazolyl)sulfenimide.

Among these benzothiazole compound type vulcanization accelerators, compounds having an alkoxy group bonded to the 4-position or the 6-position of the aromatic single ring in general formula (IV), (V), or (VI) are preferable, and compounds having an alkoxy group bonded to the 4-position are more preferable. Benzothiazole compounds having an alkoxy group at the 4-position or the 6- position of the aromatic single ring are preferable because they are easily available and easily synthesized. Benzothiazolyl-sulfenamide benzothiazyl disulfide, and benzothiazolyl-sulfenamide, having an alkoxy group at the 4-position or the 6-position of the aromatic single ring are preferable in view of the scorching property. Compounds having an alkoxy group at the 4-position of the aromatic single ring are more preferable because hardening during heat aging of the rubber composition can be suppressed.

The process for producing these vulcanization accelerator is not particularly limited, and the vulcanization accelerators can easily be produced, for example, in accordance with the process described in Japanese Patent Application Laid-Open No. 49-93361.

The benzothiazole compound type vulcanization accelerator which is used in the present invention is used in an amount of 0.2 to 10 parts by weight, preferably 0.5 to 5.0 parts by weight, per 100 parts by weight of the rubber component. When the amount is less than 0.2 parts by weight, a sufficient effect is not obtained. When the amount exceeds 10 parts by weight, the effect expected from the increased amount is not obtained, and workability such as the scorching property becomes inferior.

These vulcanization accelerators used in the present invention may suitably be used in combination with other conventional vulcanization accelerators, such as thiazole vulcanization accelerators like 2-mercaptobenzothiazyl disulfide, N-t-butylbenzothiazolylsulfenamide, and N-cyclohexylbenzothiazolylsulfenamide, and thiuram vulcanization accelerators like tetra(2-ethylhexyl)thiuram disulfide and tetramethylthiuram disulfide.

The rubber composition used for the pneumatic tire of the present invention may suitably comprise other ingredients which are generally used in rubber compositions for pneumatic tires in combination with the above essential components within the range that the effect of the present invention is not adversely affected. Examples of such ingredients include carbon black, silica, zinc oxide, stearic acid, antioxidants, wax, silane coupling agents, and vulcanizing agents.

As the vulcanizing agent, sulfur can be used. The amount of sulfur is 0.1 to 5 parts by weight, preferably 1 to 2 parts by weight, per 100 parts by weight of the rubber component. When the amount is less than 0.1 part by weight, fracture strengths and abrasion resistance of the vulcanized rubber decrease. When the amount exceeds 5 parts by weight, the rubber elasticity tends to be affected adversely.

The rubber composition used for the pneumatic tire of the present invention can be obtained by mixing the components using a mixer, such as rolls, an internal mixer, and a Banbury mixer, and used for tire treads and the like after being formed and vulcanized.

EXAMPLES

The invention will be described in more detail with reference to examples below. The present invention is not, however, limited by the examples.

1. Examples using rubber compositions not comprising aluminum hydroxide are shown below.

Examples 1 to 3 and Comparative Examples 1 to 6

Various measurements were conducted in accordance with the following methods:

(1) Evaluation of controllability (stability and controllability on wet roads)

To evaluate the controllability of a new tire, an actual vehicle ride test was conducted on a proving ground by using a four-door font-wheel-drive sedan on a wet asphalt road surface, and an overall evaluation was made by a test driver from the drive property, the braking property, response to steering, and controllability by steering. Then, the same tire as that tested above was used on 20,000 km and 40,000 km of ordinary public roads, and controllability of the tire in the intermediate period and in the final period, respectively, of tire use was evaluated.

(2) Evaluation of ride comfort

An actual vehicle ride test was conducted on a proving ground by using a four-door front-wheel-drive sedan on a dry asphalt road surface, and an overall evaluation was made based on the "feel" sensed by a test driver. A new tire and the same tire used on 20,000 km and 40,000 km of ordinary public roads were evaluated.

The results of evaluation of controllability and ride comfort are both shown in two ways. In the first way, the result obtained with the new tire in Comparative Example 1 is used as the control for the results obtained with all new tires, tires in the intermediate period, and tires in the final periods of tire use in all Examples and other Comparative Examples. In the second way, the results obtained with the new tire, the tire in the intermediate period, and the tire in the final period of tire use in Comparative Example 1 are used as the controls for the results obtained with new tires, tires in the intermediate period, and tires in the final period, respectively, in all Examples and other Comparative Examples. The results of the evaluation are shown by the difference (signs) from controls in terms of plus (+) or minus (−). The higher the number of pluses (+), the better the property. Plus-or-minus zero (±0) means that the test driver could not distinguish a difference in properties between the test tire and the control. Plus one (+1) means that the property is better than that of the control to the degree that the test driver could detect a significant difference. Plus two (+2) means that the property is better than that of the control to the degree that the test driver could detect a clear difference. Plus three (+3) means that the property is better than that of the control to the degree that the test driver could detect a very clear difference. Plus four (+4) means that the property is better than that of the control to the degree that an ordinary driver can detect a significant difference. Plus five (+5) means that the property is better than that of the control to the degree that an ordinary driver can detect a clear difference. Plus six (+6) means that the property is better than that of the control to the degree that an ordinary driver can detect a very clear difference. The higher the number of minuses (−), the inferior the property. Minus one (−1), minus two (−2), minus three (−3), minus four (−4), minus five (−5), and minus six (−6) each means that the property is inferior to that of the control to the same degree as that described for the corresponding number of plus.

Components were mixed in accordance with the formulations shown in Tables 1 and 2. Using the obtained rubber compositions for the tire tread, tires of size 195/60R14 were prepared and evaluated. The results are shown in Tables 1 and 2.

TABLE 1

| Comparative Example | 1 | 2 | 3 | 4 | 5 | 6 |
|---|---|---|---|---|---|---|
| Formulation (parts by weight) material rubber | | | | | | |
| SBR[1] | 60 | 60 | 60 | 60 | 60 | 60 |
| SBR[2] | 55 | 55 | 55 | 55 | 55 | 55 |
| aromatic oil | 20 | — | 20 | 20 | — | — |
| carbon black[3] | 65 | 65 | 65 | 65 | 65 | 65 |
| wax | 2.0 | 2.0 | 2.0 | 2.0 | 2.0 | 2.0 |

TABLE 1-continued

| Comparative Example | 1 | 2 | 3 | 4 | 5 | 6 |
|---|---|---|---|---|---|---|
| antioxidant TMDQ[4] | 0.5 | 0.5 | 0.5 | 0.5 | 0.5 | 0.5 |
| antioxidant IPPD[5] | 1.0 | 1.0 | 1.0 | 1.0 | 1.0 | 1.0 |
| stearic acid | 1.0 | 1.0 | 1.0 | 1.0 | 1.0 | 1.0 |
| dicyclopentadiene resin[6] | — | — | — | — | 20 | — |
| coumarone-indene resin[7] | — | — | — | — | — | 20 |
| zinc oxide | 3.0 | 3.0 | 3.0 | 3.0 | 3.0 | 3.0 |
| accelerator MBTS[8] | 0.5 | 0.5 | — | — | 0.5 | — |
| accelerator DPG[9] | 0.5 | 0.5 | 0.5 | 0.5 | 0.5 | 0.5 |
| accelerator MMBTS[10] | — | — | 1.0 | — | — | — |
| accelerator TBBS[11] | 0.5 | 0.5 | 0.5 | 0.5 | 0.5 | 0.5 |
| accelerator DIPDPZn[12] | — | — | — | 0.7 | — | 0.7 |
| sulfur | 1.8 | 1.8 | 1.8 | 1.8 | 1.8 | 1.8 |
| total amount of softener | 35 | 15 | 35 | 35 | 35 | 35 |
| total content of styrene[13] | 28.1 | 28.1 | 28.1 | 28.1 | 28.1 | 28.1 |
| Properties of tire controllability on wet roads | | | | | | |
| initial | control | −3 | ±0 | ±0 | +1 | +1 |
| intermediate period | −3 | −6 | −2 | −2 | −2 | −2 |
| final period | −4 | −6 | −3 | −3 | −2 | −2 |
| initial | control | −3 | ±0 | ±0 | +1 | +1 |
| intermediate period | control | −3 | +1 | +1 | +1 | +1 |
| final period | control | −2 | +1 | +1 | +2 | +2 |
| ride comfort | | | | | | |
| initial | control | −3 | ±0 | ±0 | −1 | −1 |
| intermediate period | −2 | −5 | −1 | −1 | −3 | −3 |
| final period | −3 | −5 | −2 | −2 | −3 | −3 |
| initial | control | −3 | ±0 | ±0 | −1 | −1 |
| intermediate period | control | −3 | +1 | +1 | −1 | −1 |
| final period | control | −2 | +1 | +1 | ±0 | ±0 |

TABLE 2

| Example | 1 | 2 | 3 |
|---|---|---|---|
| Formulation (parts by weight) material rubber | | | |
| SBR[1] | 60 | 60 | 60 |
| SBR[2] | 55 | 55 | 55 |
| aromatic oil | — | — | 10 |
| carbon black[3] | 65 | 65 | 65 |
| wax | 2.0 | 2.0 | 2.0 |
| antioxidant TMDQ[4] | 0.5 | 0.5 | 0.5 |
| antioxidant IPPD[5] | 1.0 | 1.0 | 1.0 |
| stearic acid | 1.0 | 1.0 | 1.0 |
| dicyclopentadiene resin[6] | 20 | — | — |
| aromatic hydrocarbon resin[14] | — | 20 | 10 |
| zinc oxide | 3.0 | 3.0 | 3.0 |
| accelerator MBTS[8] | — | — | — |
| accelerator DPG[9] | 0.5 | 0.5 | 0.5 |
| accelerator MMBTS[10] | — | — | — |
| accelerator TBBS[11] | 0.5 | 0.5 | 0.5 |
| accelerator DIPDPZn[12] | 0.7 | 0.7 | 0.7 |
| sulfur | 1.8 | 1.8 | 1.8 |
| total amount of softener | 35 | 35 | 35 |
| total content of styrene[13] | 28.1 | 28.1 | 28.1 |
| Properties of tire controllability on wet roads | | | |
| initial | +1 | +1 | ±0 |
| intermediate period | −1 | −1 | −2 |
| final period | −1 | −1 | −2 |
| initial | +1 | +1 | ±0 |
| intermediate period | +2 | +2 | +1 |
| final period | +3 | +3 | +2 |
| ride comfort | | | |
| initial | −1 | −1 | ±0 |
| intermediate period | −2 | −2 | −1 |
| final period | −2 | −2 | −2 |
| initial | −1 | −1 | ±0 |

TABLE 2-continued

| Example | 1 | 2 | 3 |
|---|---|---|---|
| intermediate period | ±0 | ±0 | +1 |
| final period | +1 | +1 | +2 |

Notes to Tables 1 and 2
[1] SBR 1500: styrene content, 23.5% by weight; manufactured by Japan Synthetic Rubber CO., Ltd.
[2] SBR 0120: styrene content, 35% by weight; 37.5% oil extended; manufactured by Japan Synthetic Rubber Co., Ltd.
[3] Carbon black: ISAF; SIEST 7H; manufactured by TOKAI CARBON Co., Ltd.
[4] TMDQ: a polymer of 2,2,4-trimethyl-1,2-dihydroquinoline
[5] IPPD: N-isopropyl-N'-phenyl-p-phenylenediamine
[6] Dicyclopentadiene resin: softening point, 80 to 92° C.; trade name, ESCOREZ 8180, manufactured by EXXON Company
[7] Coumarone-indene resin: softening point, 25° C.: a coumarone-indene oil; manufactured by KOBE OIL CHEMICAL INDUSTRY Co., Ltd.
[8] MBTS: bis(benzothiazolyl-2) disulfide
[9] DPG: diphenylguanidine
[10] MMBTS: bis(4-methylbenzothiazolyl-2) disulfide
[11] TBBS: N-t-butyl-2-benzothiazolylsulfenamide
[12] DIPDPZn: zinc O,O'-diisopropyldithiophosphate
[13] % by weight in the rubber component
[14] Aromatic hydrocarbon resin: trade name, NISSEKI POLYMER 80; manufactured by NIPPON OIL Co., Ltd.

As shown in Tables 1 and 2, the pneumatic tires of the present invention could maintain controllability and ride comfort in the intermediate to final periods of tire use at levels as high as those in the initial period of tire use.

Sufficient effects could not be obtained by using conventional vulcanization accelerators (Comparative Example 2); a combination of an aromatic oil softener and conventional vulcanization accelerators (Comparative Example 1); combinations of an aromatic oil softener and a vulcanization accelerator related to the present invention (Comparative Examples 3 and 4); a combination of a resin softener related to the present invention and conventional vulcanization accelerators (Comparative Example 5); or a combination of a resin softener which is outside the scope of the present invention and a vulcanization accelerator related to the present invention (Comparative Example 6). In contrast, excellent effects could be obtained by the present invention using combinations of resin softeners of the present invention and specific vulcanization accelerators.

2. Examples using rubber compositions comprising aluminum hydroxide are shown below.

Examples 4 to 6 and Comparative Examples 7 to 10

Various measurements were conducted in accordance with the same methods as those described above in 1., and the results of the evaluation are shown in the same manner as that described above in 1.

Components were mixed in accordance with the formulations shown in Table 3. Using the obtained rubber compositions for the tire tread, tires of size 195/60R14 were prepared and evaluated. The results are shown in Table 3.

TABLE 3

| Example | | | | | 4 | 5 | 6 |
|---|---|---|---|---|---|---|---|
| Comparative Example | 7 | 8 | 9 | 10 | | | |
| Formulation (parts by weight) material rubber | | | | | | | |
| SBR[1] | 60 | 60 | 60 | 60 | 60 | 60 | 60 |
| SBR[2] | 55 | 55 | 55 | 55 | 55 | 55 | 55 |
| aromatic oil | 20 | 20 | 20 | 20 | — | — | — |
| carbon black[3] | 65 | 65 | 65 | 65 | 65 | 65 | 65 |
| wax | 2.0 | 2.0 | 2.0 | 2.0 | 2.0 | 2.0 | 2.0 |
| antioxidant TMDQ[4] | 0.5 | 0.5 | 0.5 | 0.5 | 0.5 | 0.5 | 0.5 |
| antioxidant IPPD[5] | 1.0 | 1.0 | 1.0 | 1.0 | 1.0 | 1.0 | 1.0 |
| stearic acid | 1.0 | 1.0 | 1.0 | 1.0 | 1.0 | 1.0 | 1.0 |
| dicyclopentadiene resin[6] | — | — | — | — | 20 | 20 | 20 |
| aluminum hydroxide[7] | — | — | — | 25 | — | 25 | 25 |
| zinc oxide | 3.0 | 3.0 | 3.0 | 3.0 | 3.0 | 3.0 | 3.0 |
| accelerator MBTS[8] | 0.5 | — | — | 0.5 | — | — | — |
| accelerator DPG[9] | 0.5 | 0.5 | 0.5 | 0.5 | 0.5 | 0.5 | 0.5 |
| accelerator MMBTS[10] | — | 1.0 | — | — | — | — | 1.0 |
| accelerator TBBS[11] | 0.5 | 0.5 | 0.5 | 0.5 | 0.5 | 0.5 | 0.5 |
| accelerator DIPDPZn[12] | — | — | 0.7 | — | 0.7 | 0.7 | — |
| sulfur | 1.8 | 1.8 | 1.8 | 1.8 | 1.8 | 1.8 | 1.8 |
| total amount of softener | 35 | 35 | 35 | 35 | 35 | 35 | 35 |
| total content of styrene[13] | 28.1 | 28.1 | 28.1 | 28.1 | 28.1 | 28.1 | 28.1 |
| Properties of tire controllability on wet roads | | | | | | | |
| initial | control | ±0 | ±0 | +1 | +1 | +2 | +2 |
| intermediate period | −3 | −2 | −2 | −2 | −1 | +1 | +1 |
| final period | −4 | −3 | −3 | −3 | −1 | +1 | +1 |
| initial | control | ±0 | ±0 | +1 | +1 | +2 | +2 |
| intermediate period | control | +1 | +1 | +1 | +2 | +4 | +4 |
| final period | control | +1 | +1 | +1 | +3 | +5 | +5 |

Notes to Table 3
[1] SBR 1500: styrene content, 23.5% by weight; manufactured by Japan Synthetic Rubber Co., Ltd.
[2] SBR 0120: styrene content, 35% by weight; 37.5% oil extended; manufactured by Japan Synthetic Rubber Co., Ltd.
[3] Carbon black: ISAF; SIEST 7H; manufactured by TOKAI CARBON Co., Ltd.
[4] TMDQ: a polymer of 2,2,4-trimethyl-1,2-dihydroquinoline
[5] IFPD: N-isopropyl-N'-phenyl-p-phenylenediamine
[6] Dicyclopentadiene resin: softening point, 105° C.; trade name, LX1055, manufactured by NEVILLE CHEMICAL Co., Ltd.
[7] HISILITE 43M; trade name; manufactured by SHOWA DENKO K. K.; average particle diameter, 0.6 μm
[8] MBTS: bis(benzothiazolyl-2) disulfide
[9] DPG: diphenylguanidine
[10] MMBTS: bis(4-methylbenzothiazolyl-2) disulfide
[11] TBBS: N-t-butyl-2-benzothiazolylsulfenamide
[12] DIPDPZn: zinc O,O'-diisopropyldithiophosphate
[13] % by weight in the rubber component As shown in Table 3, the pneumatic tires of the present invention could maintain controllability in the intermediate to final periods of tire use at levels as high as those in the initial period of tire use.

Controllability in the intermediate to final periods of tire use deteriorated in the cases where none of aluminum hydroxide, resin softeners, and vulcanization accelerators related to the present invention were used (Comparative Example 7); none of aluminum hydroxide and resin softeners were used, but a benzothiazole compound type vulcanization accelerator related to the present invention was used (Comparative Example 8); none of aluminum oxide and resin softeners were used, but a dithiophosphate compound type vulcanization accelerator related to the present invention was used (Comparative Example 9); or none of resin softeners and vulcanization accelerators related to the present invention were used, but aluminum oxide was used (Comparative Example 10). Although excellent effects were obtained in the case where a resin softener and a dithiophosphate compound type vulcanization accelerator both related to the present invention were used but aluminum hydroxide was not used (Example 4), controllability of tires in the intermediate to final periods of tire use were maintained at still higher levels in the cases where a resin softener and a vulcanization accelerator both related to the present invention were used in combination with aluminum hydroxide (Examples 5 and 6).

What is claimed is:

1. A pneumatic tire comprising a tread portion formed by using a rubber composition which comprises:

a rubber component comprising 50 parts by weight or more of SBR in 100 parts by weight of the rubber component;

per 100 parts by weight of the rubber component, 20 parts by weight or more of a softener which comprises 5 to 55 parts by weight of at least one resin softener having a softening point of 35 to 150° C. and selected from the group consisting of coumarone resins, phenol-terpene resins, and petroleum hydrocarbon resins; and per 100 parts by weight of the rubber component, 0.2 to 10.0 parts by weight of at least one benzothiazole compound type vulcanization accelerator selected from the group consisting of compounds represented by following general formulae (III), (IV), (V), and (VI):

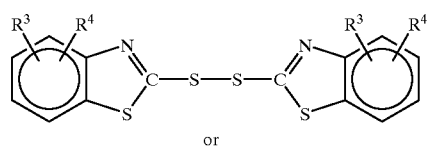

general formula (III)

or

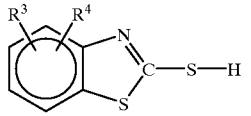

general formula (IV)

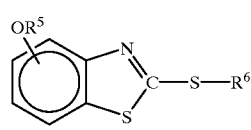

general formula (V)

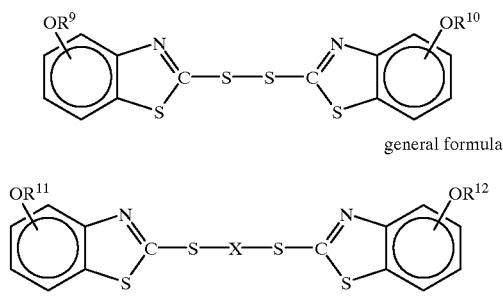

general formula (VI)

wherein $R^3$ and $R^4$ each independently represents a hydrogen atom, an alkyl group having 1 to 8 carbon atoms, or an aryl group having 6 to 10 carbon atoms, excluding the case in which $R^3$ and $R^4$ both represent hydrogen atoms; $R^5$ represents an alkyl group having 1 to 8 carbon atoms, an alkenyl group, or a cycloalkyl group; $R^6$ represents a hydrogen atom or an amino group represented by $-N(R^7)R^8$, wherein $R^7$ and $R^8$ each independently represents a hydrogen atom, an alkyl group having 2 to 4 carbon atoms, or cyclohexyl group, excluding the case in which $R^7$ and $R^8$ both represent hydrogen atoms; $R^9$ and $R^{10}$ each independently represents an alkyl group having 1 to 8 carbon atoms, an alkenyl group, or a cycloalkyl group; X represents a Zn atom, a Cu atom, or an amino group represented by $>N-R^{13}$, wherein $R^{13}$ represents an alkyl group having 2 to 4 carbon atoms or cyclohexyl group; and $R^{11}$ and $R^{12}$ each independently represents the same group as that represented by $R^9$.

2. A pneumatic tire according to claim 1, wherein $R^3$ and $R^4$ in general formula (III) representing the benzothiazole compound type vulcanization accelerator each independently represents a hydrogen atom, methyl group, ethyl group, or phenyl group, excluding the case in which $R^3$ and $R^4$ both represent hydrogen atoms.

3. A pneumatic tire according to claim 1, wherein the benzothiazole compound type vulcanization accelerator represented by general formula (III) is at least one compound selected from the group consisting of bis(4-methylbenzothiazolyl-2) disulfide, bis(5-methyl-benzothiazolyl-2) disulfide, mercapto-4-methyl-benzothiazole, and mercapto-5-methylbenzothiazole.

4. A pneumatic tire according to claim 1, wherein the alkoxy group in general formulae (IV), (V), and (VI) representing the benzothiazole compound type vulcanization accelerator is bonded to the 4-position or the 6-position of the aromatic single ring.

5. A pneumatic tire according to claim 1, wherein the alkoxy group in general formulae (IV), (V), and (VI) representing the benzothiazole compound type vulcanization accelerator is a group selected from the group consisting of methoxy group, ethoxy group, and butoxy group.

6. A pneumatic tire according to claim 1, wherein the resin softener has a softening point of 7 to 130° C.

7. A pneumatic tire according to claim 1, wherein the coumarone resin used as the resin softener is a coumarone-indene resin having a softening point of 70 to 130° C.

8. A pneumatic tire according to claim 1, wherein the phenol-terpene resin used as the resin softener is a phenol-acetylene resin or a phenol-formaldehyde resin.

9. A pneumatic tire according to claim 1, wherein the petroleum hydrocarbon resin used as the resin softener is an aliphatic cyclic hydrocarbon resin or an aromatic hydrocarbon resin.

10. A pneumatic tire according to claim 1, wherein the rubber component comprises SBR in an amount such that the styrene units of the SBR account for 20% by weight or more of 100% by weight of the rubber component.

11. A pneumatic tire according to claim 1, wherein an SBR containing 30% by weight or more of styrene is comprised in the rubber component.

12. A pneumatic tire comprising a tread portion formed by using a rubber composition which comprises:

a rubber component comprising 50 parts by weight or more of SBR in 100 parts by weight of the rubber component;

5 to 40 parts by weight of aluminum hydroxide per 100 parts by weight of the rubber component;

per 100 parts by weight of the rubber component, 20 parts by weight or more of a softener which comprises 5 to 55 parts by weight of at least one resin softener having a softening point of 35 to 150° C. and selected from the group consisting of coumarone resins, phenol-terpene resins, and petroleum hydrocarbon resins; and per 100 parts by weight of the rubber component, 0.2 to 10.0 parts by weight of at least one benzothiazole compound type vulcanization accelerator selected from the group consisting of compounds represented by following general formulae (III), (IV), (V), and (VI):

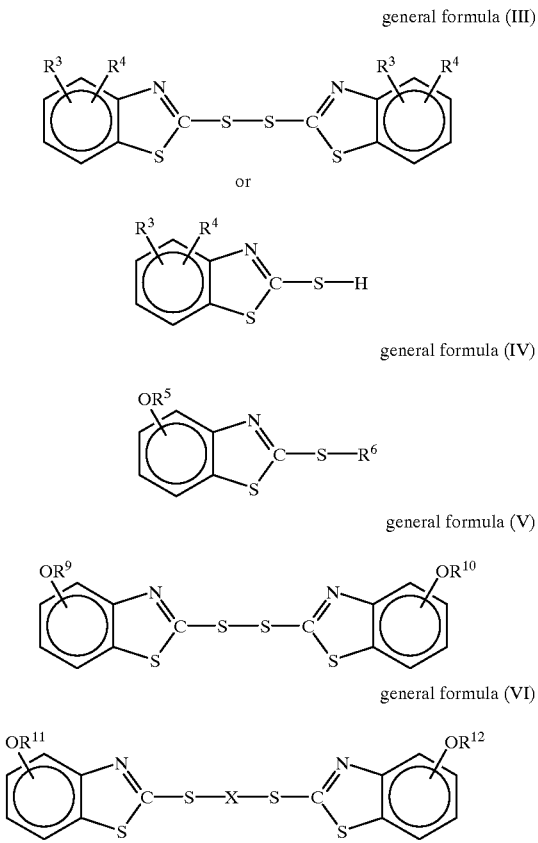

wherein $R^3$ and $R^4$ each independently represents a hydrogen atom, an alkyl group having 1 to 8 carbon atoms, or an aryl group having 6 to 10 carbon atoms, excluding the case in which $R^3$ and $R^4$ both represent hydrogen atoms; $R^5$ represents an alkyl group having 1 to 8 carbon atoms, an alkenyl group, or a cycloalkyl group; $R^6$ represents a hydrogen atom or an amino group represented by $-N(R^7)R^8$, wherein $R^7$ and $R^8$ each independently represents a hydrogen atom, an alkyl group having 2 to 4 carbon atoms, or cyclohexyl group, excluding the case in which $R^7$ and $R^8$ both represent hydrogen atoms; $R^9$ and $R^{10}$ each independently represents an alkyl group having 1 to 8 carbon atoms, an alkenyl group, or a cycloalkyl group; X represents a Zn atom, a Cu atom, or an amino group represented by $>N-R^{13}$, wherein $R^{13}$ represents an alkyl group having 2 to 4 carbon atoms or cyclohexyl group; and $R^{11}$ and $R^{12}$ each independently represents the same group as that represented by $R^9$.

13. A pneumatic tire according to claim 12, wherein $R^3$ and $R^4$ in general formula (III) representing the benzothiazole compound type vulcanization accelerator each independently represents a hydrogen atom, methyl group, ethyl group, or phenyl group, excluding the case in which $R^3$ and $R^4$ both represent hydrogen atoms.

14. A pneumatic tire according to claim 12, wherein the benzothiazole compound type vulcanization accelerator represented by general formula (III) is at least one compound selected from the group consisting of bis(4)-methylbenzothiazolyl-2) disulfide, bis(5-methyl-benzothiazolyl-2) disulfide, mercapto-4-methyl-benzothiazole, and mercapto-5-methylbenzothiazole.

15. A pneumatic tire according to claim 12, wherein the alkoxy group in general formulae (IV), (V), and (VI) representing the benzothiazole compound type vulcanization accelerator is bonded to the 4-position or the 6-position of the aromatic single ring.

16. A pneumatic tire according to claim 12, wherein the alkoxy group in general formulae (IV), (V), and (VI) representing the benzothiazole compound type vulcanization accelerator is a group selected from the group consisting of methoxy group, ethoxy group, and butoxy group.

17. A pneumatic tire according to claim 12, wherein the resin softener has a softening point of 70 to 130° C.

18. A pneumatic tire according to claim 12, wherein the coumarone resin used as the resin softener is a coumarone-indene resin having a softening point of 70 to 130° C.

19. A pneumatic tire according to claim 12, wherein the phenol-terpene resin used as the mifreftener is a phenol-acetylene resin or a phenol-formaldehyde resin.

20. A pneumatic tire according to claim 12, wherein the petroleum hydrocarbon resin used as the resin softener is an aliphatic cyclic hydrocarbon resin or an aromatic hydrocarbon resin.

21. A pneumatic tire according to claim 12, wherein the rubber component comprises SBR in an amount such that the styrene units of the SBR account for 20% by weight or more of 100% by weight of the rubber component.

22. A pneumatic tire according to claim 12, wherein an SBR containing 30% by weight or more of styrene is comprised in the rubber component.

* * * * *